United States Patent [19]

Smith

[11] Patent Number: 4,681,278

[45] Date of Patent: Jul. 21, 1987

[54] GUIDE FOR RESTORING AND REMOVING A TAPE LEADER BLOCK TO AND FROM A TAPE CASSETTE

[75] Inventor: David E. Smith, Lafayette, Colo.

[73] Assignee: Aspen Peripherals, Longmont, Colo.

[21] Appl. No.: 896,673

[22] Filed: Aug. 14, 1986

Related U.S. Application Data

[63] Continuation-in-part of Ser. No. 872,951, Jun. 11, 1986.

[51] Int. Cl.$^4$ .................... G03B 1/04; G11B 15/32; G11B 23/107
[52] U.S. Cl. .................... 242/195; 226/92
[58] Field of Search .................... 242/195, 197–200; 226/91, 92; 360/93, 95, 132

[56] References Cited

U.S. PATENT DOCUMENTS 4,383,660  5/1983  Richard et al. .................... 242/197
4,399,936  8/1983  Rueger .................... 226/92

Primary Examiner—John M. Jillions
Attorney, Agent, or Firm—Dorr, Carson, Sloan & Peterson

[57] ABSTRACT

A tape leader block can be restored to and removed from its housing in a tape cassette by a guide which comprises a tripartite wedge system having an upwardly inclined plane, a downwardly inclined plane and an inwardly inclined plane which serve to guide the leader block into and out of a receiver opening in the tape cassette's leader block housing.

3 Claims, 3 Drawing Figures

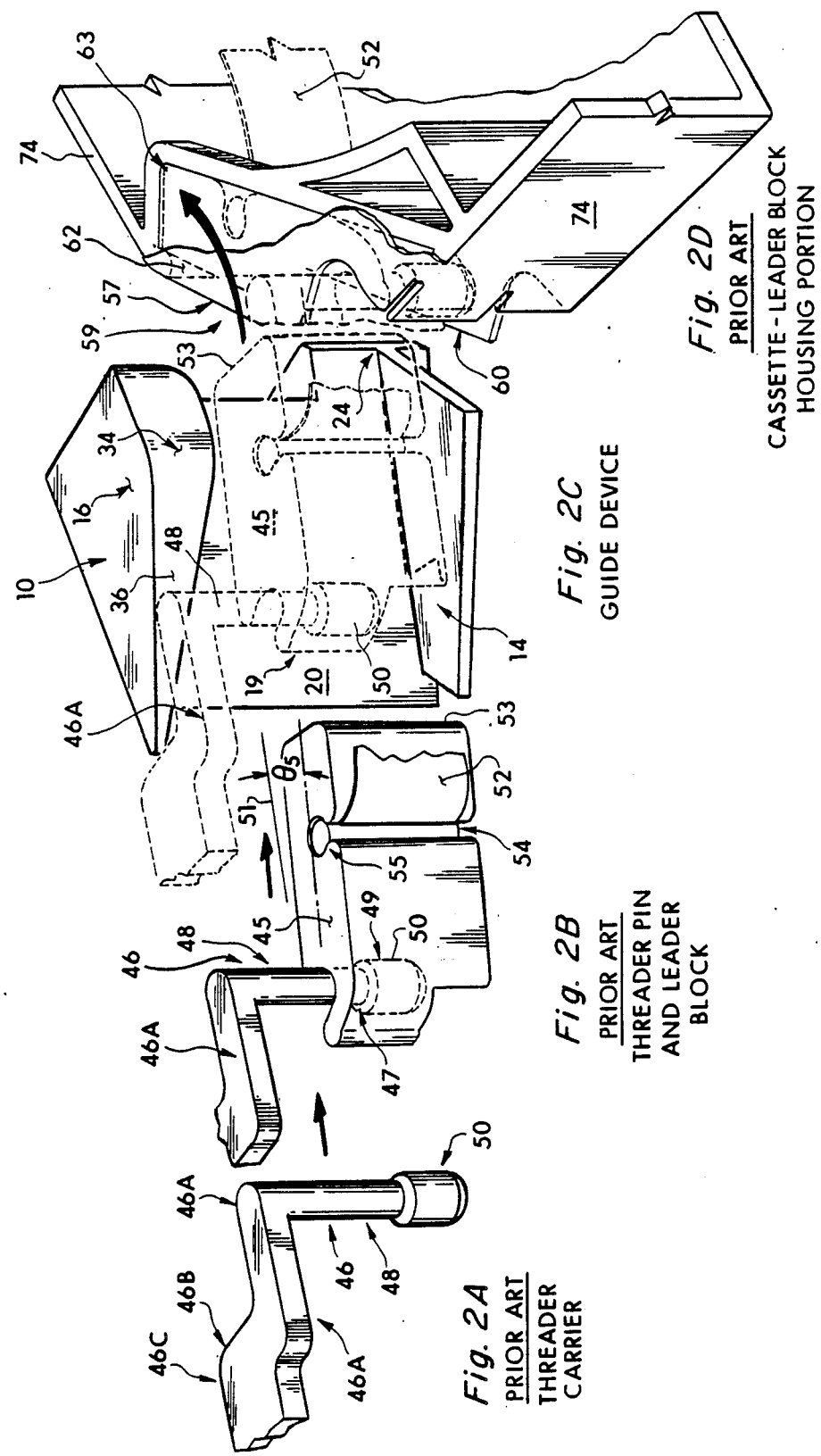

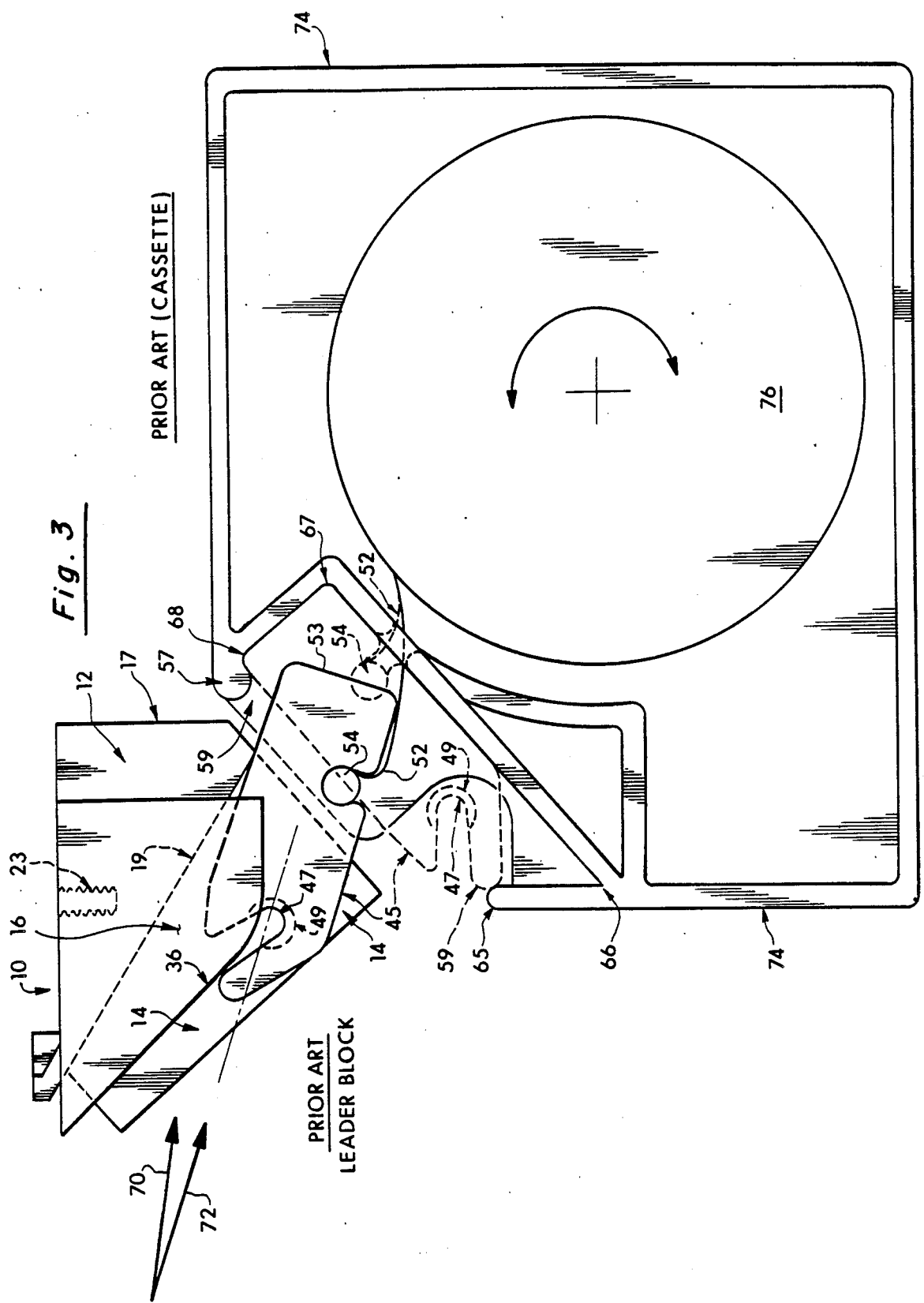

GUIDE FOR RESTORING AND REMOVING A TAPE LEADER BLOCK TO AND FROM A TAPE CASSETTE

This patent application is a continuation-in-part of U.S. patent application 872,951, filed June 11, 1986.

BACKGROUND OF THE INVENTION (1) Field of the Invention

This invention generally relates to tape guiding devices, especially those used in magnetic tape drive systems. More particularly this invention is concerned with guide devices for restoring and removing tape leader blocks to and from a tape cassette's leader block housing.

(2) Description of the Prior Art

Various devices have been developed for automatically threading magnetic tapes from tape supply reels, past transducer heads, and on to take-up reels. One widely used tape threading device is disclosed in U.S. Pat. No. 4,399,936 ("the -936 patent"). The tape is usually dispensed from a cassette by a pulling action upon a leader block. This action pulls the leader block out of a receiver opening in the cassette's leader block housing. This in turn pulls the tape out of the cassette. The leader block is restored back into the cassette's leader block housing by a pushing action upon the leader block by a threader arm which is coupled to the leader block.

Most leader blocks are housed in a leader block housing which has a diagonal orientation with respect to one corner of an otherwise rectangular-shaped tape cassette. U.S. Pat. No. 4,383,660 ("the -660 patent") well represents this type of tape cassette system wherein the receiver opening presents a diagonal receiver opening in one corner of the cassette. The leader block fills and closes the diagonal opening when the leader block occupies the leader block housing. The leader block is held in the leader block housing by means of a cantilevered arm which forms a part of the front surface of the tape cassette. The cantilevered arm usually has a rounded edge which engages a rounded lip boss on the underside of the front of the leader block. This engagement is in the nature of a compression fit between the rounded edge of the cantilevered arm and a rounded lip boss of the leader block. In effect, the cantilevered arm acts as a projecting leaf spring which positions the leader block within the cassette housing. As is well illustrated in FIGS. 3a, 3b and 3c of the -660 patent, a pushing force upon the leader block will engage and seat it in the leader block housing. In effect, the rounded edge of the cantilevered arm will be pushed slightly downward by a force transmitted to the leader block's lip boss. This force is provided by the forward push of the threader pin under a powered action of the incoming threader arm. Assuming proper alignment between the incoming leader block and the diagonal receiver opening, the rounded lip boss of the leader block will slide past the rounded edge of the cantilevered arm and thereby seat the leader block in the leader block housing.

However, restoration of the leader block to the cassette's leader block housing presupposes that the leader block has been precisely delivered to the receiver opening of the leader block housing. This precise delivery in turn depends on a number of factors including (1) an initial successful coupling of the threader pin with the threader pin receiver in the leader block (2) a continued tight registry between the threader pin and those slots of the leader block which cooperate with the threader pin and (3) lack of wear in other parts of the threader arm system. Therefore, some understanding of certain problems encountered in the restoration and/or removal of leader blocks to and from the cassette's leader block housing also will provide a further appreciation of the utility and advantages of the guide device disclosed in this patent application.

It should first be noted that threader pins which carry leader blocks can have various configurations. For example, they are often presented in the form of a cylinder suspended from a rod which in turn is suspended from a threader pin carrier. The forward ends of the most commonly used leader blocks are usually provided with seating means which are usually presented in the form of openings or slots which are highly registrable with whatever threader pin configuration employed. Most threader pins are intended to complete registry with the leader block's receiver slot while the threader pin is carrying the leader block. Most threader pins currently in use have a relatively short enlarged cylindrical end member whose diameter is greater than that of a more elongated rod-like top portion of the threader pin which in turn is attached to the underside of the threader arm. Preferably, the leader block will be supported in a substantially horizontal orientation by the vertical threader pin when the cylinder of the threader pin is properly seated in, and otherwise in registry with, the threader pin receiver opening in the front end of the leader block.

Threader pin carrier devices such as the one disclosed in the −936 patent deliver their associated threader pin directly to the leader block under the power and action of gear motor torque which is delivered to the threader arm which supports the threader pin carrier. That is to say, the threader arm's gear motor torque is employed both to thread the tape through the tape deck system and to restore and remove the leader block to and from the cassette's leader block housing. Other threader arm devices such as the one described in U.S. patent application Ser. No. 872,951 deliver the leader block to the cassette by means of a gear and motor system which is separate from that of the threader arm. In either case however, the leader block restoration and removal operations cause a great deal of wear upon the openings in the leader block in which the rod and cylinder members of the threader pin are seated. The threader pin itself is also subject to some degree of wear. Moreover, and regardless of whether the threader arm motor is used to directly insert the leader block in the cassette or whether a leader block inserter toggle system is employed for this purpose, the gear/motor systems are themselves subject to varying degrees of wear. The other threading operations that these prior threader arm devices are called upon to perform also produce a great deal of gear/motor wear. Furthermore, the leader block may not be aligned or assembled on the tape itself.

Eventually, wear from all such sources leads to deviations from the preferred horizontal orientation of the leader block with respect to the threader pin from which the leader block is suspended. The end result of such wear is that the rear end of the leader block "sags" downwardly from its preferred horizontal orientation. This sag causes the leader block to collide with the upper and lower edges of the receiver opening of the tape cassette housing. In other words, a collision free insertion of the leader block into the receiver opening of the leader block housing requires that the leader block be in a substantially horizontal orientation. The need for a smooth insertion of the leader block in general, and the rear end of the leader block in particular, are made more pronounced by the fact that delivery of the leader block to the receiver opening of the cassette's leader block housing represents the final phase of a powered delivery of the leader block to the cassette. Moreover, in some prior art devices this powered delivery is carried out at high speeds. Hence, there is a great need to carry out this final phase of the leader block delivery with a high degree of precision. Any substantial misalignment between the incoming leader block and the cassette's receiver opening will cause the leader block to collide with edges of the receiver opening. Hence, wear and particularly wear upon the threader pin seating upon which the cylinder portion of the threader pin rests, is perhaps the largest single factor in producing violent and debilitating collisions between the leader block and the edge of the receiver opening rather than smooth, well aimed insertions of the leader block into the receiver opening.

Slower insertion speeds are not however a particularly viable solution to this collision problem. Both threader arm powered systems and separately powered leader block insertion systems have their own power and/or speed requirements. Consequently, most prior art threader arms are usually designed and powered much more by considerations associated with pulling the tape though a convoluted tape deck path than they are by considerations associated with some eventual collision of the leader block upon some appropriate part of the cassette. Hence there is a need for a device which can quickly and accurately restore a sagging leader block back to a horizontal orientation just prior to its insertion into the receiver opening of the cassette's leader block housing.

SUMMARY OF THE INVENTION

The guide device disclosed herein is intended to minimize many of the problems now associated with restoring a leader block to its tape cassette housing. To some lesser degree it can also aid in smoothly removing the leader block from the cassette. Above all it seeks to avoid violent collisions between the edges of the receiver opening and the incoming leader block. It provides a simple reliable, long lasting device for placing the leader block in a horizontal orientation and accurately aiming and guiding it into the cassette's receiver opening. Thus it serves to prevent collisions with the top and bottom of the receiver opening as well as with its sides. With certain optional adaptations, this guide can also aid in producing a more smooth removal of the leader block from the cassette. One very important aspect of this device is the fact that restoration of the leader block to the cassette can be carried out by placing the incoming leader block in a horizontal orientation while simultaneously directing it away from a course which lies parallel to the rear vertical edge of the receiver opening and toward an inward course which leads in the direction of a desired region of the cassette's leader block housing. Thus the restored horizontal orientation serves to prevent collisions between the incoming leader block and the upper horizontal edge and/or the lower horizontal edge of the receiver opening, while simultaneously serving to prevent leader block collisions with an outside vertical edge of the receiver opening. In same preferred applications of this device, the guide can also serve to keep the threader pin carrier from rotating out of position under certain operating circumstances, for example, when the cassette loading door is closed without a cartridge being in place.

Aside from the obvious advantages of avoiding breakage of parts and operational malfunctions, other advantages follow from an assured, accurate insertion of the leader block into the receiver opening of the cassette's leader block housing. For example, the threader arm motor/gear train system can be designed solely in consideration of the torque, speed, power, momentum, etc., requirements of its other tape threading functions rather than in contemplation of an eventual leader block/cassette collision. Likewise the leader block removal and restoration operations can be designed solely on the basis of those power and speed associated with sliding the leader block's boss past the cassette's cantilevered arm.

Moreover, this guide device can be used in conjunction with various kinds of threader arm mechanisms, such as, for example, the pantoarm device taught in the −936 patent. However, it is particularly well suited for cooperation with the threader arm and camming device taught in U.S. patent application Ser. No. 872,951, and the teachings of this patent application are hereby incorporated into this patent disclosure.

These advantages are achieved by a guide device having a tripartite wedge configuration. The first wedge can be thought of as a base to which the second and third wedges are attached. Again, the device is attached to a tape drive system adjacent to the receiver opening in the tape cassette's leader block housing. The nose of the first wedge is located away from the receiver opening. Thus, the wedge rises as it proceeds toward the receiver opening. Hence the first wedge serves to aim the incoming leader block away from a collision course with the outside, vertical edge of the receiver opening and toward an unobstructed course leading into the receiver opening.

The second wedge serves to correct for any sag in the leader block from the essentially horizontal leader block orientation needed to smoothly insert the block into the receiver opening. In the absence of such a horizontal orientation, the top edge of the leader block would collide with the top edge of the receiver opening and/or the bottom edge of the front of the leader block would collide with the bottom edge of the reeiver opening. The underside of the third wedge serves to further define an open region through which the leader block passes as it passes through the guide. It wedges the leading edge of the incoming leader block downward if it is too high. It also wedges the incoming leader block back downward if any part of it "bounces" upward from the lower, second wedge upon impact with said second wedge. The outside of the third wedge can also serve as a camming surface for certain parts of the overall threader arm mechanism such as certain select portions of the threader pin carrier hereinafter more fully described. To further facilitate this camming function, the outside surface of the region near the rear of the third wedge can be rounded off. This feature may for example further assist in providing a smooth passage of the threader pin carrier past this rounded region both in the incoming direction and in the outgoing direction. That is to say a rounded corner may facilitate the threader pin carrier to slide past the edge of the third wedge when the leader block is being removed from the cassette as well as when it is being inserted into the cassette. Moreover, this rounded corner also can serve as a camming surface for portions of the threader arm mechanism such as the threader pin carrier in order to further aid in aiming the leader block into the receiver opening. The lower part of the rounded corner of the third wedge can also be rounded off to aid in aiming the leader block both in its incoming and in its outgoing passage through the guide. Similarly, in one highly configuration of this guide device, the lower corner of the base region of a preferred L-shaped first wedge also can be removed or rounded off to prevent collisions with the outgoing leader block.

The guide device can be attached to the tape drive system by fastening means which are preferably attached to the rear side of the first wedge portion and/or to the bottom or base side of said first wedge portion. The device can of course be made from a wide variety of materials including hard plastic materials such as polycarbonate which is a preferred construction material.

DESCRIPTION OF THE DRAWINGS

FIG. 2 is a series of perspective views showing a threader pin carrier which will support a sagging leader block shown approaching the guide, passing through the guide and being inserted into the tape cassette.

FIG. 3 is a plan view showing the guide aiming an incoming leader block into the interior of the cassette's leader block housing.

DESCRIPTION OF THE PREFERRED EMBODIMENTS

Figure 1:
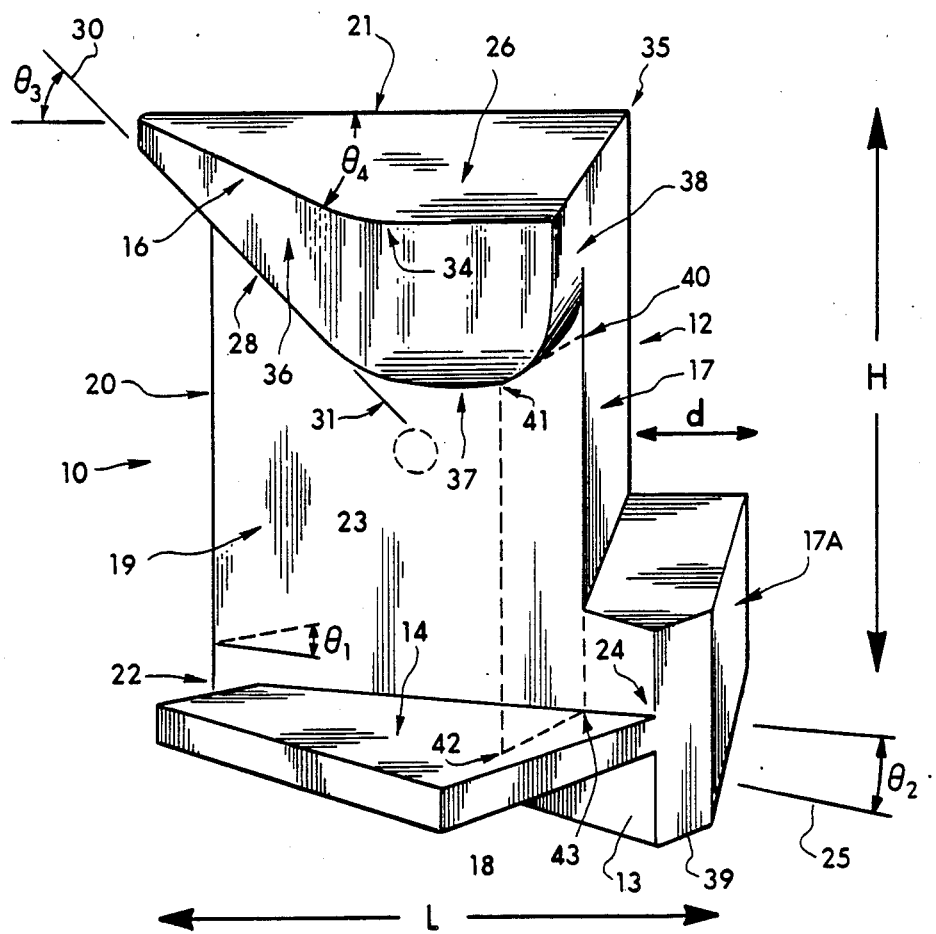
FIG. 1 is a perspective view of our guide device for restoring and removing a leader block to and from a tape cassette.

FIG. 1 shows a perspective view of our tripartite wedge device 10. It is comprised of a first wedge 12, a second wedge 14 and a third wedge 16. Although it is not shown, the device's bottom 18 will thus have a wedge or triangular configuration. The wide upper rear portion 17 of the first wedge 12 preferably, but not necessarily, also has a lower wide portion 17A which extends a distance d beyond the rear portion 17 and thus forms a first wedge 12 which preferably has an L configuration having a base 13 wider than its top when viewed from the side. In any case, the opposite side of the first wedge 12 terminates in a rear, tapered edge 20. Assuming that the back side 21 of the first wedge 12 is in the same plane as the paper, the wedge 12 will form a vertical, inclined surface 19 which rises as it proceeds from its rear tapered edge 20 to its forward wide edge 17. Preferably the first wedge defines a slope angle theta 1, which will preferably be from about 5 and about 30 degrees. In another preferred embodiment of this invention, the first wedge 12 also will contain means 23 (screw, bolt, etc.) for attaching the device 10 to a tape drive system not shown.

The second wedge 14 is attached substantially perpendicular to, and near the bottom of, the inclined surface 19 of wedge 12. Preferably the second wedge 14 will extend from a lower ledge 22 located near the tapered edge 20 of the first wedge 12, to a higher ledge 24 located near edge 17A. That is to say, in a preferred embodiment of this guide, the second wedge 14 will extend at least partially into the base of the L shape, beyond the upper, wide edge 17 of the first wedge 12. Preferably, the second wedge 14 will rise from a horizontal plane 25 at some angle theta which is from about 5 degrees to about 25 degrees from horizontal.

The third, or upper, wedge 16, also projects in a plane which is substantially perpendicular to the vertical surface 19 of the first wedge 12. The lower surface 28 of the third wedge 16, which lies essentially along line 30-31 of FIG. 1, descends at some angle theta 3 from the horizontal. Preferably theta 3 will be from about 15 to about 45 degrees. In a highly preferred embodiment of this invention the top surface 26 of the third wedge 16 will not present an exactly triangular configuration, but rather have its corner region 34 rounded off. That is, the front face 36 of the upper wedge 16 will round into the upper region 38 of the rear portion 17 of the wedge 16. Similarly, the undersurface 37 of rounded region 34 may also be rounded off to facilitate leader block passage.

In another preferred embodiment of this invention the top surface 26 of the third wedge 16 extends from the rear edge 20 of wedge 12 at an angle theta 4 which is greater than angle theta 1 of the first wedge 12 and based on the assumption that theta 1 and theta 4 are both measured from a common point such as edge 20. Preferably, theta 4 will be from about 10 to 45 degrees. Thus the front face 36 of third wedge 16 will project beyond inclined surface 19 of first wedge 12. Preferably, the front face 36 of third wedge 16 will come into contact with certain portions of a threader pin carrier shown in FIG. 2 in such a manner that the forward end of the leader block is aimed into the cassette's receiver opening. Moreover, in a highly preferred embodiment of this guide device, contact between certain portions of the carrier and front face 36 will serve to keep the carrier from rotating out of position if, for example, the cassette door (not shown) is closed without a cartridge (not shown) being in place.

In an analogous manner the corner region 39 between surface 19 and surface 17A can be rounded off. Such a rounded surface may also aid in a smooth withdrawal of the leader block from the leader block housing. The bottom surface 28 of the upper wedge 16, the vertical, inclined surface 19, and the upper surface of the second, or lower wedge 14, will thus define a "window region" roughly defined by points 40, 41, 42 and 43 through which an incoming leader block, not shown, passes just before it is inserted into the cassette's receiver opening. Passage through this window region will serve to, at least partially, bring the leader block to a substantially horizontal orientation. As previously noted, in a preferred embodiment of this device, the second or lower wedge extends beyond the window region 40, 41, 42 43 for a distance which most preferably approximates the distance d between surface 17 and surface 17A. Thus the upper, rear edge of the leader block is freed before its lower rear edge loses contact with lower wedge 14. This arrangment also may contribute to bringing the leader block to its desired final, horizontal orientation. In another highly preferred embodiment of this invention, the upper edge 24 of the lower wedge 19 is located substantially adjacent to the lower edge of the receiver opening of the cassette's leader block housing shown in FIG. 2.

The physical dimensions of the tripartite wedge are not critical to the operation of this device. However, most preferably the height H shown in FIG. 1 will be from about 0.75 to about 1.75 inches and the length L will be from about 0.75 to about 2.0 inches while the window region 40, 41, 42 and 43 will have a width (i.e., the distance from point 42 to point 43) from about 0.25 to about 0.50 inches and a height (i.e., the distance from point 40 to point 43) of from about 0.625 to about 1.25 inches.

Similarly some highly preferred embodiments of the guide will have (1) a first wedge ascending slope angle theta 1 of from about 15 to about 25 degrees, (2) a second wedge ascending slope angle theta 2 of from about 15 to about 25 degrees from the horizontal, (3) a third wedge descending slope angle theta 3 of from about 20 to about 45 degrees from the horizontal and (4) a third wedge horizontal wedge angle theta 4 which is greater than the horizontal angle theta 1 of the first wedge. Highly preferred theta 4 angles will lie in the range of from about 25 to about 45 degrees. A greater slope in theta 4 as compared to theta 1 is highly preferred because it may also serve to contact the threader pin carrier at an angle which better positions the rod portion of the threader, and hence the leader block to which it is attached, in an orientation which serves to better aim the front end of the leader block into the receiver opening of the cassette's leader block housing.

FIG. 2 depicts the guide device 10 performing its intended aiming function. Part A of FIG. 2 shows a perspective view of a leader block carrier 46A having an irregular configuration. The carrier 46A supports a threader pin 46 which is further comprised of a rod portion 48 and a cylinder portion 50. In certain preferred embodiments of this guide, portions of the front face 36 may contact with select regions, e.g., projecting regions 46B and 46C, of leader block carrier 46A. As previously noted such contact may facilitate aiming the leader block into the leader block housing. Such contact may also serve to keep the carrier rotating out of position during other operations, e.g., cassette door closing, etc. Part B shows an incoming leader block 45 suspended from threader pin 46. The threader in includes a rod 48 which terminates in a cylindrical base 50. The rod 48 and base 50 are seated in their respective openings 47 and 49 in the leader block 45. The leader block 45 is shown attached to a tape 52 attached to leader block 45 by a in 54. The leader block 45 is depicted as "sagging" downward from an imaginary horizontal line 51 at some angle theta 5. This sag or deviation from the horizontal line 51, is shown greatly exaggerated in FIG. 2. As previously discussed this sag is usually the result of combined wear and/or misalignment throughout various portions of the tape drive system. Regardless of the source and position of such wear, the end result is a sag which will cause some part of the top surface 55 of leader block 45 to collide with some part of the top edge 57 of the receiver opening 59 and/or cause the lower part of front edge 53 of leader block 45 to collide with the lower edge 60 of receiver opening 59.

Part C of FIG. 2 shows the leader block 45 actually passing through the guide device 10. The leader block 45 is shown being delivered into receiver opening 59 in the general direction of inside corner region 63 of the leader block housing depicted in Part D of FIG. 2. Preferably, the higher ledge 24 of the lower wedge 14 will lie adjacent to and substantially parallel with the lower edge 60 of receiver opening 59. The aiming of leader block 45 toward the inside corner region 63 and away from a collision course with a boss region 60 and/or vertical edge 62 of receiver opening 59 is produced by the inclined surface 19 of the guide Device 10. FIG. 2 does not depict carrier 46A in camming contact with front face 36 of upper wedge 16. FIG. 2, Part D also illustrates how the top of receiver opening 59 is preferably defined and covered by a top 63 which extends across the entire top of cassette 74.

FIG. 3 is a cut away plan view which depicts (1) leader block 45 being delivered into a receiver opening 59 generally defined by points 65, 66, 67 and 68 and, alternatively, (2) the leader block 45 seated in said receiver opening 59 which forms a part of housing 65, 55, 57 and 68. A tape reel 76, upon which a tape 52 is wound is also shown. This view particularly illustrates how the guide device 10 diverts the incoming leader block 45 from a course generally depicted by the direction of arrow 70 to a course generally depicted by the direction of arrow 72. This diversion will serve to avoid a collision of the front 53 of leader block 45 with boss region 57, or vertical edge region 68 of receiver opening 59. Incoming leader block 45 is depicted in partial contact with a portion of a face 19 of wedge 12. Threader pin 46 is not shown, but a seat 47 for its rod portion 48 and is not shown, but a seat 47 for its rod portion 48 and a seat 49 for its cylinder portion 50 are shown as parts of leader block 45. In this particular illustration, those regions e.g., 46B and 46C of the leader block carrier 46A which, preferably, will subsequently contact front face 36 of the third wedge 16 are not shown.

Those skilled in this art will appreciate that the guide devices shown in FIGS. 1 through 3 should not be taken as limitations upon the broader teachings of this invention. Moreover, it should also be noted that while this patent disclosure generally speaks in the context of guides for magnetic tape drive systems, the guide device disclosed herein could just as well be used in tape drive systems other than those associated with magnetic tape drives, e.g., with optical storage and surface deformation tape systems.

Thus having disclosed this invention, I claim:

1. A tripartite wedge guide for aiding the restoration of a leader block into a leader block housing in a tape cassette, said guide comprising:

a first wedge having its wedging surface in a substantially vertical plane which rises as it approaches the leader block housing of the cassette;

a second wedge attached to a lower region of, and substantially perpendicular to, the vertical plane of the first wedge such that the second wedge rises at it approaches the leader block housing; and a third wedge attached to an upper region of, and substantially perpendicular to, the vertical plane of the first wedge such that the third wedge descends as it approaches the leader block housing and thereby partially defines a window region between said first, second and third wedges through which the leader block passes in order to at least partially restore the leader block to a substantially horizontal orientation and to aim the leader block into the interior of the leader block housing.

2. A tripartite wedge guide for aiding the restoration of a leader block in to a leader block housing in a tape cassette, said guide comprising:

a first wedge having its wedging surface in a substantially vertical plane which rises as it approaches the leader block housing of the cassette and having an L-shaped configuration, with said first wedge further comprising means for attaching the first wedge to a tape drive system and a portion which extends beyond an upper portion of the first wedge;

a second wedge attached to a lower region of, and substantially perpendicular to, the vertical plane of the first wedge, such that the second wedge extends at least partially beyond a base portion of the L-shaped side, configuration of the first wedge and rising as it approaches a region adjacent to a lower edge of a receiver opening of the leader block housing; and a third wedge attached to an upper region of, and substantially perpendicular to, the vertical plane of the first wedge such that the third wedge descends as it approaches an upper edge of the receiver opening of the leader block housing and thereby partially defining a window region between said first, second and third wedges through which the leader block passes in order to at least partially restore the leader block to a substantially horizontal orientation and to aim the leader block into the interior of the leader block housing, with said third wedge being further provided with a rounded corner which serves to cam a portion of a threader pin carrier which further serves to aim the leader block into the leader block housing.

3. A tripartite wedge guide made of a hard plastic material for aiding the restoration and removal of a leader block to and from a leader block housing in a tape cassette, said guide comprising:

a first wedge having an L-shaped side configuration with a height from about 0.75 to about 1.75 inches and a length of from about 0.75 to about 2.0 inches and having its wedging surface in a substantially vertical plane which rises at a slope angle from about 10 to about 30 degrees as it leads toward the rear inside corner of the leader block housing of the cassette, with said first wedge further comprising a threaded hole for receiving a bolt which is attached to a tape drive system and a base portion which extends a distance of about 0.125 inches to about 0.5 inches beyond an upper portion of the first wedge;

a second wedge attached to a lower region of, and substantially perpendicular to, the vertical plane of the first wedge, such that the second wedge extends a major part of the width of the base portion of the first wedge and rises at a slope angle of from about 5 to about 25 degrees as it approaches a region adjacent to a lower edge of a receiver opening of the leader block housing; and a third wedge attached to an upper region of, and substantially perpendicular to, the vertical plane of the first wedge such that the third wedge descends at a slope angle of between about 15 and about 45 degrees as it approaches an upper edge of the receiver opening of the leader block housing and thereby partially defining a window region between said first, second and third wedges which has a width of from about 0.25 to about 0.50 inches and a height of from about 0.625 to about 1.0 inches and through which the leader block passes in order to at least partially restore the leader block to a substantially horizontal orientation and to aim the leader block toward a region near the far rear corner of the leader block housing, with said third wedge extending beyond the surface of the vertical plane of the first wedge at an angle which is greater than the 10 to 30 degree slope angle of the first wedge, said third wedge also having a rounded corner which serves to cam a portion of a threader pin carrier to further aim the leader block into the leader block housing, with said rounded corner further being provided with an underside region which is also rounded off.

* * * * *